United States Patent
Hidaka (10) Patent No.: US 6,274,018 B1
(45) Date of Patent: Aug. 14, 2001

(54) ELECTRODEIONIZATION APPARATUS COMPRISING SUB-DESALINATION CHAMBERS

(75) Inventor: Masao Hidaka, Tokyo (JP)

(73) Assignee: Organo Corporation, Tokyo (JP)

( * ) Notice: Subject to any disclaimer, the term of this patent is extended or adjusted under 35 U.S.C. 154(b) by 0 days.

(21) Appl. No.: 09/532,929

(22) Filed: Mar. 22, 2000

(30) Foreign Application Priority Data

| Mar. 25, 1999 | (JP) | ................................................. 11-081675 |
| Sep. 13, 1999 | (JP) | ................................................. 11-258993 |
| Dec. 20, 1999 | (JP) | ................................................. 11-360384 |
| Feb. 8, 2000 | (JP) | ................................................. 12-030355 |

(51) Int. Cl.$^7$ ..................................................... B01D 61/48
(52) U.S. Cl. ........................... 204/524; 204/525; 204/533; 204/536; 204/632
(58) Field of Search ..................................... 204/524, 525, 204/533, 536, 632

(56) References Cited

U.S. PATENT DOCUMENTS

| 4,632,745 | 12/1986 | Giuffrida et al. ...................... 204/301 |
| 4,925,541 | 5/1990 | Giuffrida et al. .................. 204/182.5 |
| 4,931,160 | 6/1990 | Giuffrida .............................. 204/301 |
| 6,149,788 | * 11/2000 | Tessier et al. ........................ 204/524 |

FOREIGN PATENT DOCUMENTS

| 0 170 895 A2 | 2/1985 | (EP) . |
| 0 519 504 A1 | 12/1992 | (EP) . |

OTHER PUBLICATIONS

Patent Abstracts of Japan, Publication No. 09024374, Publication Date Jan. 28, 1997, 1 page.
Patent Abstracts of Japan, Publication No. 01151911 A, Publication Date Jun. 14, 1989, 1 page.

* cited by examiner

*Primary Examiner*—Arun S. Phasge
(74) *Attorney, Agent, or Firm*—Rodenthal & Osha L.L.P.

(57) ABSTRACT

Two sub-desalination chambers $d_1$ and $d_2$ are defined by a cation exchange membrane 3 on one side, an anion exchange membrane 4 on the other side, and an intermediate ion exchange membrane 5 in between and are filled with ion exchange materials 8 to construct a desalination chamber D. Concentrating chambers 1 are provided via the cation exchange membrane 3 and the anion exchange membrane 4 on both sides of the desalination chamber D. The desalination chambers D and the concentrating chambers 1 are provided between an anode 7 and a cathode 6. While a voltage is applied between the anode 7 and the cathode 6, water is supplied to one of the two sub-desalination chambers $d_2$ and then, water discharged from the first sub-desalination chamber $d_2$ is supplied to a second sub-desalination chamber $d_1$. Concentrate water is supplied to the concentrate chambers.

17 Claims, 6 Drawing Sheets

ELECTRODEIONIZATION APPARATUS COMPRISING SUB-DESALINATION CHAMBERS

BACKGROUND OF THE INVENTION

1. Field of the Invention

The present invention relates to an electrodeionization apparatus which can reduce electric resistance, thereby minimizing power consumption, and to an electrodeionization method using such an apparatus. This electrodeionization apparatus can be used for production of deionized water in such applications as electronics, pharmaceutical, nuclear or fossil-fuelea power generation, food and beverage, and laboratory.

2. Description of the Related Art

One conventional method for producing deionized water is to pass the water to be treated through ion exchange resins. In this method, the ion exchange resins must be chemically regenerated when they become exhausted. In order to eliminate this troublesome operation, an electrodeionization (hereinafter abbreviated to EDI) method has been developed and commercialized which does not require chemical regeneration.

Figure 5:
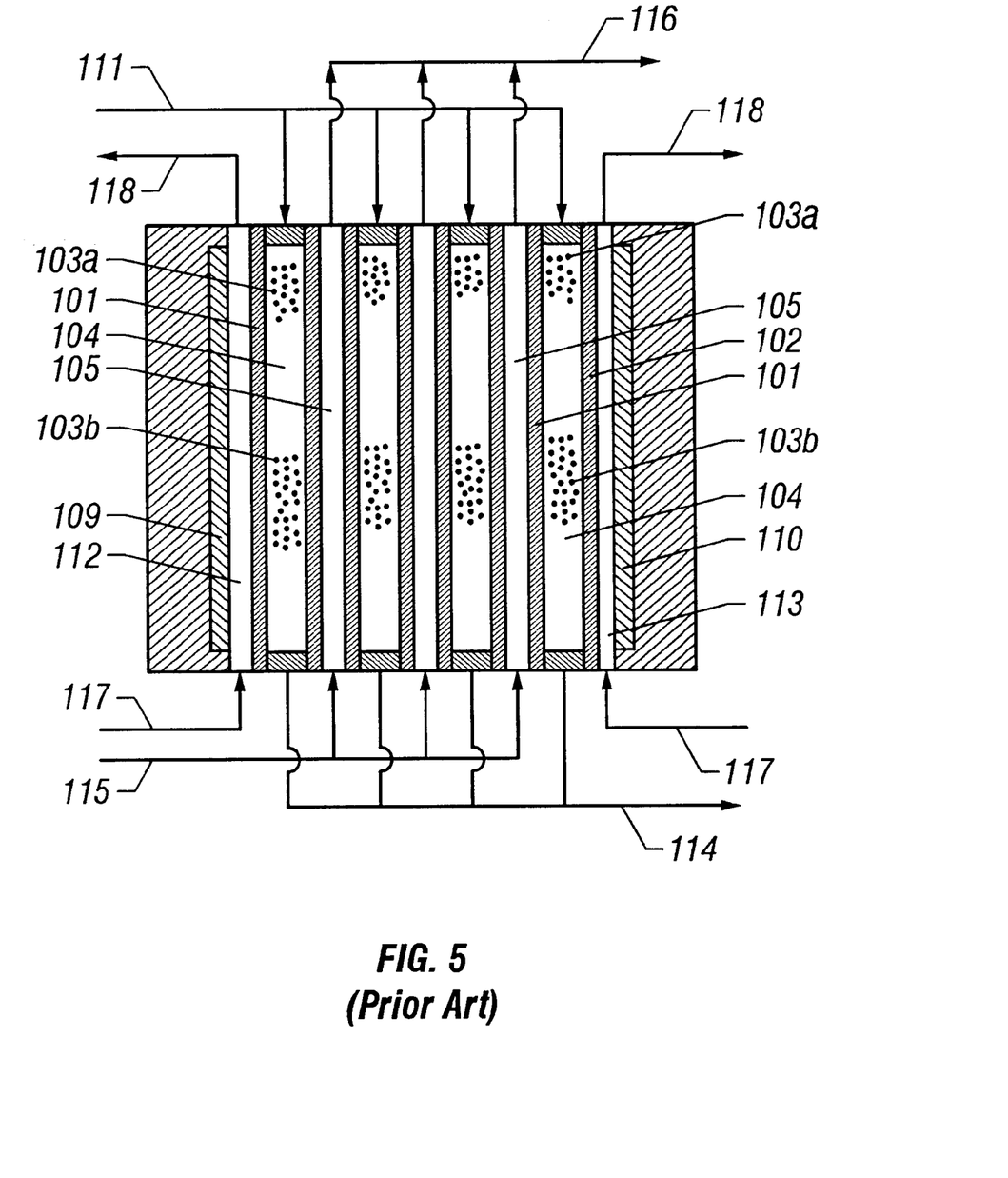
FIG. 5 is a schematic diagram of a conventional EDI apparatus.

FIG. 5 is a cross sectional view of a typical conventional electrodeionization apparatus. As shown in the figure, a series of desalination chambers 104 are formed by alternately providing cation exchange membranes 101 and anion exchange membranes 102 with spaces in between, and by filling every other space with ion exchange materials 103. One side (front side) of each desalination chamber, from where water to be treated is fed, is filled with an anion exchange resin 103a and the other side (back side) of the desalination chamber, where treated water flows out, is filled with a mixed bed 103b of cation and anion exchange resins. The sections adjacent to desalination chambers 104 which are formed by anion exchange membrane 102 and cation exchange membrane 101 and which are not filled with ion exchange material 103 act as concentrate chambers 105 where concentrate water flows.

Figure 6:
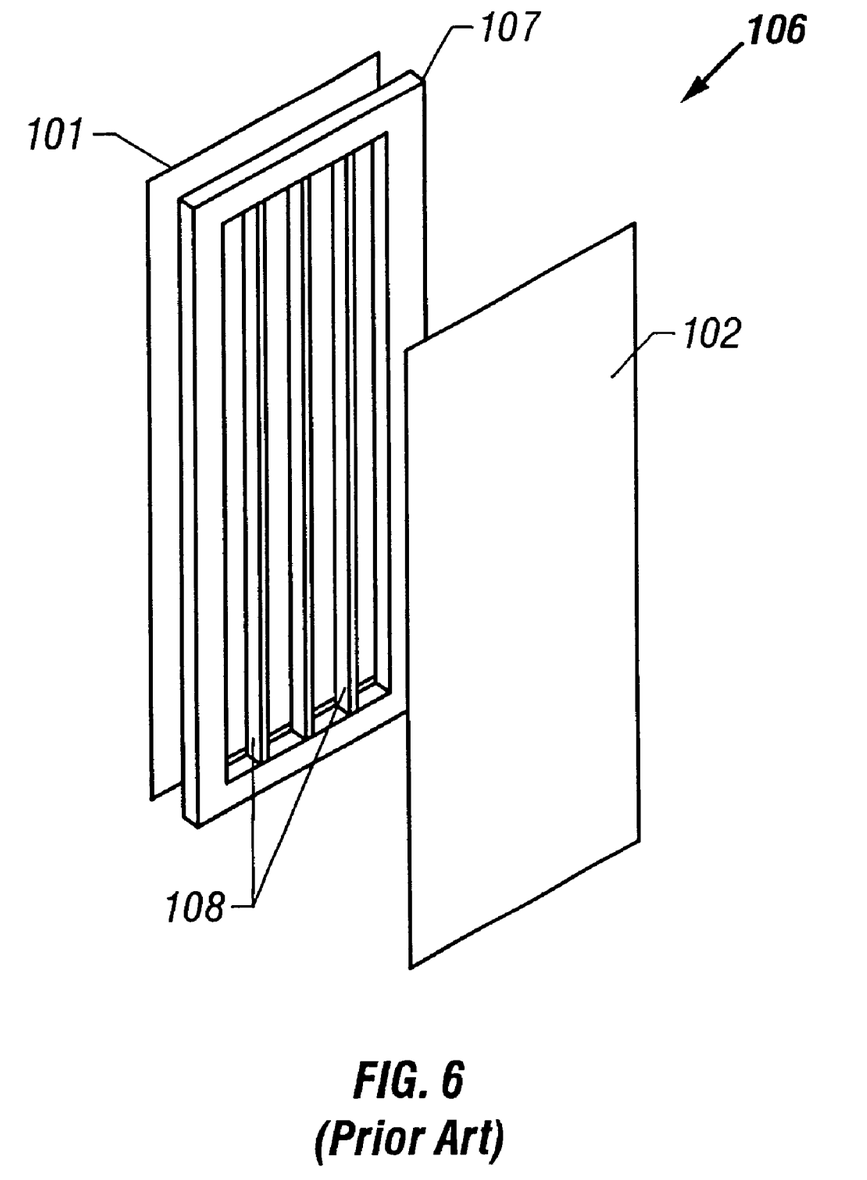
FIG. 6 is a partial perspective diagram of a deionizing module used as a conventional desalination chamber.

As shown in FIG. 6, a deionizing module 106 is formed by a cation exchange membrane 101, an anion exchange membrane 102, and ion exchange materials 103 filling the space between these ion exchange membranes.

Specifically, one side of a frame 107 is sealed with a cation exchange membrane 101. The upper side (front side) of the interior of the frame 107 is filled with an anion exchange resin 103a and the lower side (back side) of the frame interior is filled with a mixed ion exchange resins 103b. The other side of the frame 107 which is then sealed with an anion exchange membrane 102. Because ion exchange membranes 101 and 102 are soft and flexible, when frame 107 is filled with the ion exchange materials 103 and sealed with ion exchange membranes on both sides, in a typical frame 107, a plurality of vertical ribs 108 are provided to prevent nonuniform filling of ion exchange materials 103 due to curving of ion exchange membranes. Although not shown in the figure, inlets for the water to be treated are provided at the upper side of the frame 107 and outlets for the treated water are provided at the lower side of the frame 107.

FIG. 5 shows a plurality of these deionizing modules 106 provided in parallel with spacers (not-shown) in between. A cathode 109 is provided on one side of the parallel deionizing modules 106 and an anode 110 is provided on the opposite side of the parallel deionizing modules 106. The spacers are provided between deionizing modules 106 and concentrate chambers 105. A separating membrane such as a cation exchange membrane 101, an anion exchange membrane 102, or a diaphragm which does not have any ion exchange functionality is provided externally on both of the outermost concentrate chambers 105, as necessary. A cathode chamber 112 and an anode chamber 113 are provided in the sections separated by the above-mentioned separating membranes, which sections come in contact with the cathode 109 and anode 110. As can be seen, in such a conventional EDI apparatus, the number of the concentrate chambers is larger than the number of desalination chambers by one.

Figure 4:
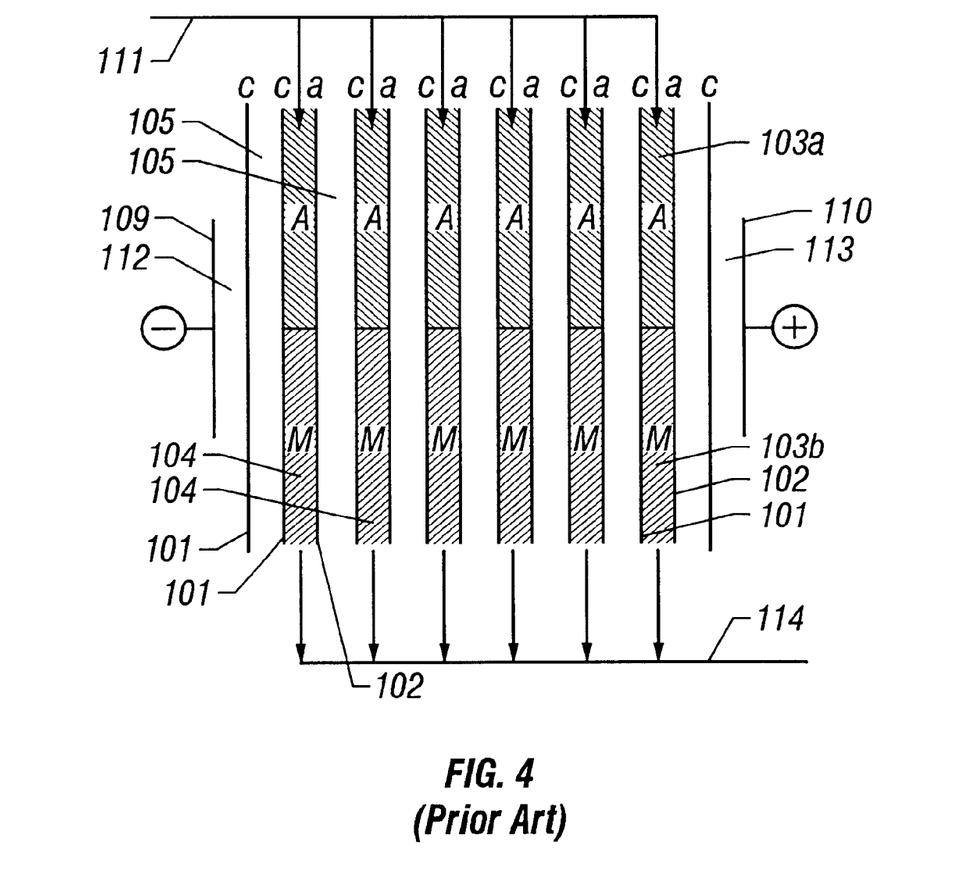
FIG. 4 is a diagram showing the principle of a conventional EDI apparatus.

A deionized water producing process using such an EDI apparatus is explained referring to FIGS. 4 and 5, where FIG. 4 schematically shows a relationship between the desalination and concentrate chambers. In FIG. 4, cathode chamber 112 and anode chamber 113 are separated from concentrate chambers 105 by cation exchange membrane 101. Specifically, a direct current is applied between the cathode 109 and anode 110. Water to be treated is fed from the water to be treated supply line 111 and concentrate water is fed from the concentrate water supply line 115. Electrode water is supplied from electrode water supply lines 111 and 117. The water to be treated which has been fed from the water to be treated supply line 111 flows through the desalination chambers 104. Anions such as chloride and sulfate ions in the water are removed when the water flows through the anion exchange resin 103a in the front side and then cations such as magnesium and calcium ions are removed when the water flows through the downstream mixed ion exchange resins 103b of the cation and anion exchange resins. The concentrate water fed from the concentrated water supply line 115 flows upward through each concentrate chamber 105, receives impurity ions via the cation exchange membrane 101 and anion exchange membrane 102 and is discharged from the concentrate water discharge line 116 as concentrate water containing concentrated impurity ions. The electrode water supplied from the electrode water supply lines 117 and 117 is discharged from electrode water discharge lines 118 and 118. Thus, deionized water can be produced in the deionized water discharge line 114.

There have been various attempts to reduce the electric resistance of this type of EID apparatus in order to reduce the amount of electric power consumption when such an apparatus is used to remove impurity ions from water to be treated. However, because the filling method and amount of the ion exchange materials used in the desalination chambers depend on the desired quality of treated water, there are restrains on how much the electric resistance at the desalination chamber can be reduced, and measures have often been taken for reducing the electric resistance at the concentrate chambers. For example, Japanese Patent Laid-Open Publication No. Hei 9-24374 discloses a method for reducing the electric resistance at the concentrate chambers by adding electrolytes thereto. A method for reducing electric resistance in the concentrate chamber by circulating concentrate water to promote an increase in its electric conductivity has also been proposed.

However, in the method for reducing the electric resistance in the concentrate chambers by adding electrolytes thereto, a pump for supplying the electrolytes to the concentrate chambers, a chemical storage tank, and supply pipes must be provided, and therefore, both installation area and costs increase. Moreover, chemicals must periodically be supplied and managed, causing a problem that considerable personal attention is required, even though the apparatus is referred to as a continuous electrodeionization unit. The method for reducing the electric resistance in the concentrate chambers by circulating concentrate water, thereby increasing the electrical conductivity in the concentrate chambers has also a disadvantage in that hardness components such as calcium and magnesium within the concentrate water also become highly concentrated and form scales which increase electric resistance.

SUMMARY OF THE INVENTION

One object of the present invention is to provide an EDI apparatus which can reduce electric resistance without adding any chemical to the concentrate water, and a deionized water producing method using such an apparatus.

An apparatus according to the present invention comprises a series of desalination chambers, each of which has one side sealed by a cation exchange membrane and the other side sealed by an anion exchange membrane, wherein an intermediate ion exchange membrane is provided between the cation and anion exchange membranes to divide each desalination chamber into two adjacent sub-desalination chambers. Concentrate chambers are provided on both sides of each desalination chamber via said cation exchange membrane and anion exchange membrane. These desalination chambers and concentrate chambers are provided between an anode and a cathode. Water to be treated is fed to one of the two sub-desalination chambers while a voltage is applied across the sub-desalination chambers. The water discharged from the one of the two sub-desalination chambers is then sent to the other sub-desalination chamber. Concentrate water flows in the concentrate chamber to remove impurity ions from the water to be treated, and deionized water is thus produced. With this configuration, the number of concentrate chambers per sub-desalination chamber filled with ion exchange materials, can be reduced by a factor of approximately 2 and the electric resistance of the EDI apparatus can be reduced significantly compared to the conventional EDI apparatus.

Moreover, by using an anion exchange membrane, a cation exchange membrane, or a discrete anion and cation exchange membranes as the intermediate ion exchange membrane (not a bipolar membrane), ions can move from one sub-desalination chamber to another, resulting in more efficient ion removal.

DESCRIPTION OF PREFERRED EMBODIMENT

Figure 1:
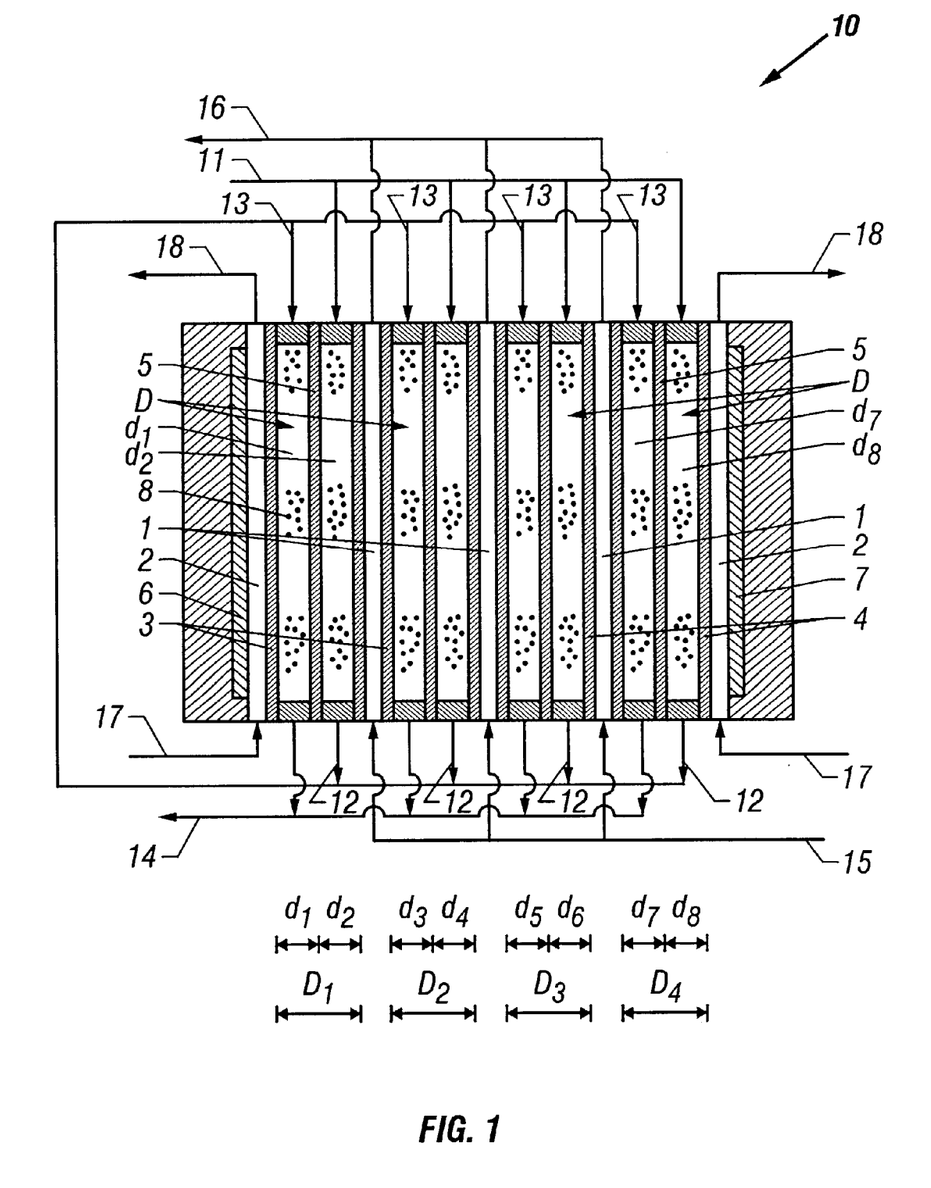
FIG. 1 is a schematic diagram showing an EDI apparatus according to the present invention.
Figure 2:
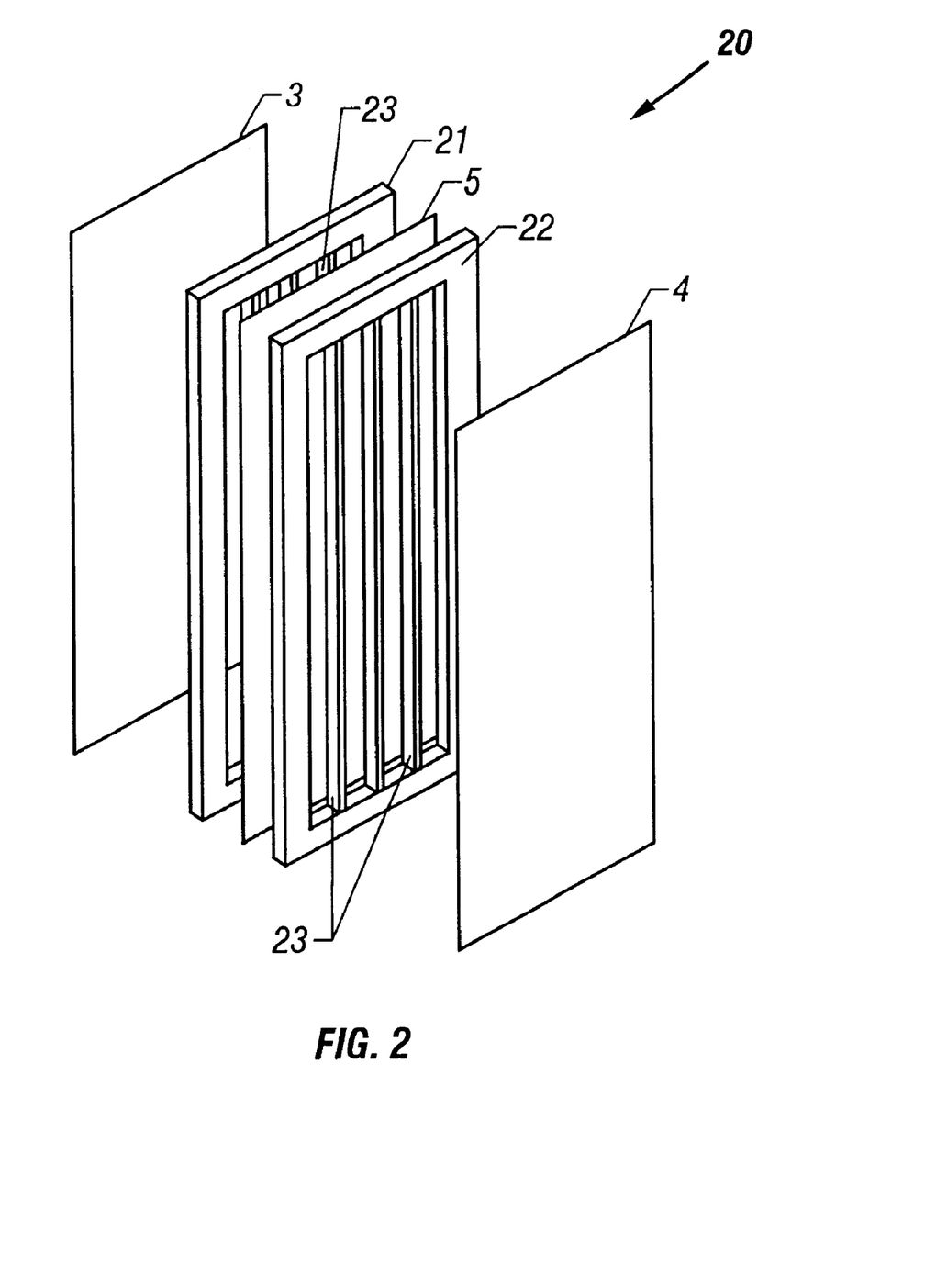
FIG. 2 is a partial perspective diagram of a deionizing module comprising a desalination chamber.

The preferred embodiment of the EDI apparatus according to the present invention is described referring to FIGS. 1 and 2. FIG. 1 is a schematic diagram showing an EDI apparatus according to the present invention. FIG. 2 is a partial perspective diagram of a deionizing module comprising two sub-desalination chambers. As shown in FIG. 1, a cation exchange membrane 3, an intermediate ion exchange membrane 5 and an anion exchange membrane 4 are provided in that order with spaces in between. An ion exchange material 8 fills the space between each cation exchange membrane 3 and each intermediate ion exchange membrane 5 to form first sub-desalination chambers $d_1$, $d_3$, $d_5$, and $d_7$. An ion exchange material 8 fills the space between each intermediate ion exchange membrane 5 and each anion exchange membrane 4 to form second sub-desalination chambers $d_2$, $d_4$, $d_6$, and $d_8$. A first sub-desalination chamber $d_1$ and a second sub-desalination chamber $d_2$ are combined to form a desalination chamber $D_1$. Similarly, first sub-desalination chambers $d_3$, $d_5$, and $d_7$ are respectively combined with second sub-desalination chambers $d_4$, $d_6$, and $d_8$ to form desalination chambers $D_2$, $D_3$, and $D_4$. The space between desalination chambers $D_2$ and $D_3$, etc, formed by an anion exchange membrane 4 and a cation exchange membrane 3 which is not filled with any ion exchange material 8 acts as a concentrating chamber 1 in which concentrate water flows. Therefore, in the apparatus, a desalination chamber $D_1$, a concentrating chamber 1, a desalination chamber $D_2$, a concentrating chamber 1, a desalination chamber $D_3$, a concentrating chamber 1, and a desalination chamber $D_4$ are provided in that order from the left of the diagram. Each of treated water discharge lines 12 of the second sub-desalination chambers $d_2$, $d_4$, $d_6$, and $d_8$ are connected to water to be treated supply lines 13 of the first sub-desalination chambers $d_1$, $d_3$, $d_5$, and $d_7$.

One single desalination chamber comprises a deionizing module formed by two hollow frames and three ion exchange membranes. Specifically, as shown in FIG. 2, one side of a first frame 21 is sealed by a cation exchange membrane 3 and the hollow spaces of the first frame 21 are filled with an ion exchange materials 8. Then, the other side of the first frame 21 is sealed by an intermediate ion exchange membrane 5 to form a first sub-desalination chamber. A second frame 22 is then attached to this first sub-desalination chamber with the intermediate ion exchange membrane 5 interposed in between, and the second frame 22 is filled with an ion exchange material 8. The side of the second frame 22 which does not touch the intermediate ion exchange membrane 5 is sealed by an anion exchange membrane 4 to form a second sub-desalination chamber. Because ion exchange membranes 3, 4, and 5 are soft, and flexible, when the first and second frames 21 and 22 are filled with ion exchange materials 8 and sealed with ion exchange membranes on both sides, a plurality of ribs 23 are vertically provided in the first and second frames 21 and 22 to prevent nonuniform filling of ion exchange materials 8 due to curved ion exchange membranes. Although not shown in the figure, the first frame 21 and the second frame 22 are provided with inlets for water to be treated or for treated water on their upper ends, and outlets for treated water provided on their lower ends when the flow of water through the first and second sub-desalination chambers is concurrent. Alternatively, the upper ends of the first frame 21 and the second frame 22 are provided with inlets for water to be treated and outlets of treated water and outlets are provided for treated water and inlets for treated water on their lower ends when the flow of water through the first and second sub-desalination chambers is countercurrent. FIG. 1 shows a plurality of these deionizing modules 20 provided in parallel with not-shown spacers in between. A cathode 6 is provided on one side of the parallel deionizing modules 20 and an anode 7 is provided on the other side of the parallel deionizing modules 20. The above-mentioned spacers are provided between deionizing modules 20 and concentrating chambers 1. A separating membrane such as a cation exchange membrane, an anion exchange membrane, or a diaphragm which does not have ion exchange functionality can be provided externally on both of the outermost desalination chambers D. Electrode chambers 2 and 2 can be provided in the section separated by the separating membrane which respectively come in touch with the electrodes 6 and 7. As said hollow frame, any material can be used which can form a space to be filled by ion exchange material(s) between the frame and an ion exchange membrane when the frame and ion exchange membrane are layered. For example, this frame can be formed from pier members having a quadrangular cross section.

When this type of EDI apparatus is used for producing deionized water, it operates as follows. A direct current is applied between the cathode 6 and the anode 7. Water to be treated is fed from the water to be treated supply line 11 and concentrate water is fed from the concentrate water supply line 15. Electrode water is supplied from the electrode water supply lines 17 and 17. The water to be treated fed from the water to be treated supply line 11 flows in the second sub-desalination chambers $d_2$, $d_4$, $d_6$, and $d_8$ through the ion exchange material 8 where impurity ions are removed. The treated water then passes through the treated water discharge lines 12 of the second sub-desalination chambers to the water to be treated supply lines 13 of the first sub-desalination chambers, and flows in the first sub-desalination chambers $d_1$, $d_3$, $d_5$, and $d_7$ through the ion exchange material(s) 8 where impurity ions are again removed. Deionized water can thus be produced in the deionized water discharge line 14. The concentrate water supplied from the concentrate water supply line 15 passes through each of the concentrate chambers, receives impurity ions via the cation 3 and anion 4 exchange membranes, and is discharged from the concentrate water discharge lines 16. The electrode water is supplied from the electrode supply lines 17 and 17 and discharged from the electrode water discharge lines 18 and 18. In this manner, the impurity ions in the water to be treated are electrically removed.

The intermediate ion exchange membrane can be any of a single membrane of cation or anion exchange membrane or a discrete membrane of anion and cation exchange membranes. When a discrete membrane is employed with an anion exchange membrane on either upper or lower side of the apparatus and a cation exchange membrane on the other side, the height (area) each of the anion and cation exchange membranes are determined by quality of the water to be treated, the treatment objectives, or the like. When a single membrane is employed, the nature of the ion exchange membrane is determined by the desired type of ion(s) to be removed.

The first or second sub-desalination chamber can have any thickness, and therefore, the thickness can be set at the optimum thickness for the type of ion exchange material(s) to be filled in the first or the second sub-desalination chamber and its filling method. Therefore, the thickness of the first sub-desalination chamber can be set at 3 mm, the thickness of the second sub-desalination chamber can be set at 6 mm, and the entire thickness, that is the thickness of the desalination chamber, can be set at 9 mm. When a plurality of desalination and concentrate chambers are alternately provided, the thickness of the desalination chamber compartment defined by the cation and anion exchange membranes on both sides of the desalination chamber can be increased compared to the case of a conventional apparatus, and can be set within a range of 1.5 to 18 mm, more preferably in a range of 6.5 to 15 mm, and even more preferably, in a range of 9 to 13 mm.

Any ion exchange material can be used to fill in the desalination chamber including, but not limited to, a single bed of anion exchange material, a single bed of cation exchange material, a mixed ion exchange material of an anion and a cation exchange materials, and a combination of these. Any material which has ion exchange functionality can be used as the ion exchange material including, but not limited to, an ion exchange resin, an ion exchange fiber, and a combination of these.

The water to be treated can flow in either direction in the first and second sub-desalination chambers. That is, the flow directions in the first and second sub-desalination chambers can be opposite from each other, instead of the same direction as described in the present embodiment. The order of sub-desalination chambers can be reversed, that is, the water to be treated can first flow in the first sub-desalination chamber and then flow in the second sub-desalination chamber, instead of the configuration of the present embodiment. The flow direction of the concentrated water is determined suitably.

Figure 3:
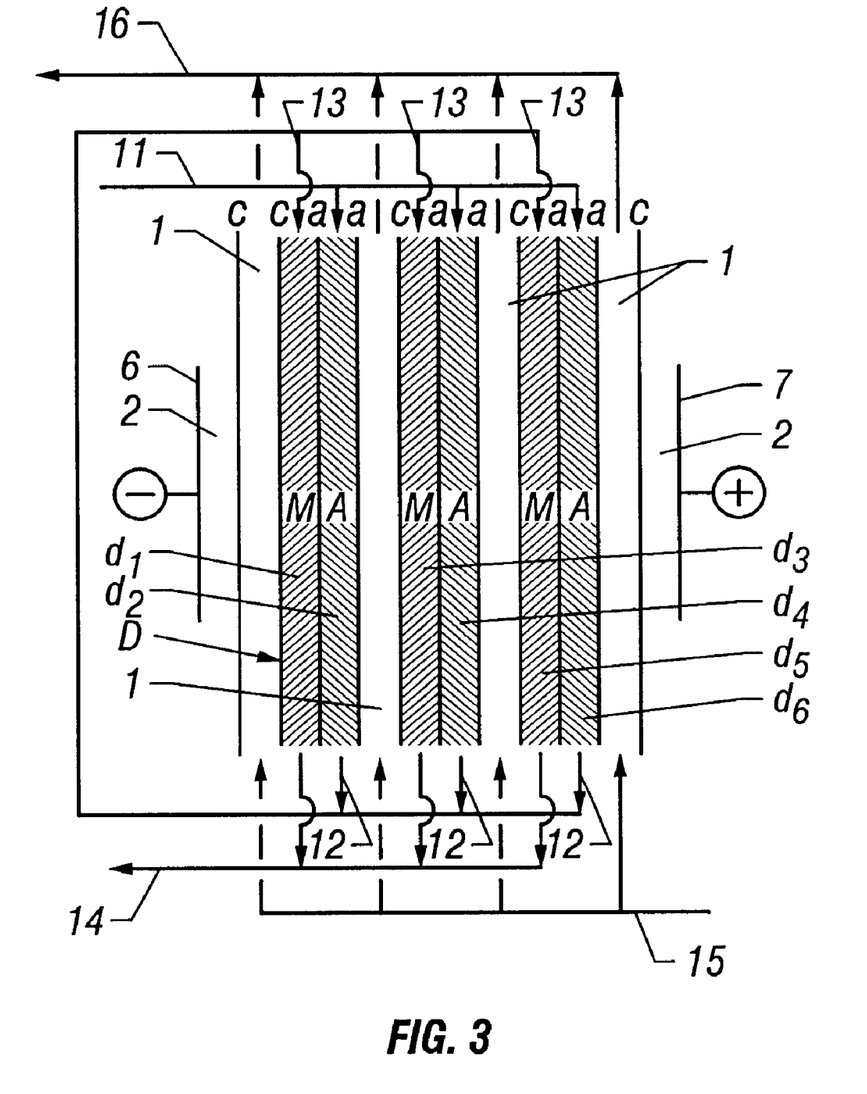
FIG. 3 is a diagram showing the principle of an EDI apparatus according to the present invention.

FIG. 3 shows the present embodiment with an anion exchange membrane used as the intermediate ion exchange membrane, a mixed anion and cation exchange resins used to fill the first sub-desalination chamber $d_1$, and a single anion exchange resin used to fill the second sub-desalination chamber $d_2$. FIG. 3 shows a relationship between the desalination and concentrate chambers shown in FIG. 1, and is to be compared with FIG. 4 showing a conventional apparatus. In FIG. 3, the water to be treated flowing through the second sub-desalination chamber and the water discharged from the second sub-desalination chamber and sent to the first sub-desalination chamber all flow downward, while the concentrate water flows upward, which is opposite to the direction of water to be treated. The water to be treated is fed from the water to be treated supply line 11 and flows down the second sub-desalination chambers $d_2$, $d_4$, and $d_6$ ($d_8$ is not shown) through a single anion exchange resin A where anion constituents such as chloride ions and sulfate ions are transferred to the concentrate chambers via an anion exchange membranes a and removed. This ion removal especially occurs around the input end for the water to be treated. During this process, the cation constituents of the water to be treated remain in the water. The water which has passed through the treated water discharge lines 12 of the second sub-desalination chambers then passes through the water to be treated supply lines 13 of the first sub-desalination chambers, flows in the first sub-desalination chambers $d_1$, $d_3$, and $d_5$ ($d_7$ not shown) through a mixed cation and anion exchange resins M where cation constituents such as magnesium and calcium ions are transferred to the concentrate chambers via cation membranes c and removed. Ion removal is especially pronounced around the input end of the first sub-desalination chambers (input end of the second sub-desalination chambers). Thus, deionized water can be produced in the deionized water discharge line 14. The concentrate water having concentrated cation constituents such as magnesium and calcium ions removed around the input end of the first sub-desalination chambers is immediately discharged from the concentrating chambers and scale formation within the concentrate chambers can be prevented.

As can be seen from FIG. 3, in the present invention, the number of concentrate chambers per sub-desalination chamber filled with ion exchange material(s) can be reduced by a factor of approximately 2 when compared with a conventional apparatus, and thus, the electric resistance of the EDI apparatus can be significantly reduced. Moreover, because the number of the concentrate chambers is relatively small compared to that of the conventional apparatus, the ion concentration of the concentrate water flowing through the concentrate chambers can be increased, resulting in improved electric conductivity and further reduction in the electric resistance, and at the same time, the flow rate of the concentrate water through the concentrate chambers can be increased, thereby preventing scales from forming in the concentrate chambers. The amount of ion exchange membrane used can also be reduced.

In the present embodiment, by setting the thickness of the first sub-desalination chambers filled with a mixed anion and cation exchange materials in a range between 0.8 mm and 8 mm, more preferably 2–5 mm and setting the thickness of the second sub-desalination chambers filled with an anion exchange material in a range between 5 mm and 15 mm, more preferably 6–10 mm, low electric resistance and high current efficiency can be achieved. If the thickness each of the first sub-desalination chambers is less than 0.8 mm, the water does not remain in the first sub-desalination chambers for a sufficiently long time period and the quality of the treated water is degraded. If, on the other hand, the thickness each of the first sub-desalination chambers is greater than 8 mm, the electric resistance increases, resulting in difficulties in safe operation of the apparatus. Similarly, if the thickness each of the second sub-desalination chambers is less than 5 mm, the water does not stay therein long enough, causing a degradation in the quality of the treated water. If the thickness each of the second sub-desalination chambers is greater than 15 mm, the increase in electrical resistance compared to an increase in the current efficiency becomes more pronounced, and, therefore, this configuration is not preferred.

As described above, in the present invention, one desalination chamber is divided into two sub-desalination chambers. With this configuration, the number of concentrate chambers per sub-desalination chamber filled with ion exchange material can be reduced by a factor of approximately 2 compared to that of the conventional apparatus and the electric resistance of the EDI apparatus can be significantly reduced. Moreover, because the number of concentrate chambers is relatively small compared to the case of the conventional apparatus, the ion concentration of the concentrate water flowing through the concentrate chambers can be increased, the electric conductivity can be increased, resulting in further reduction in electric resistance, and the flow rate of the concentrate water flowing in the concentrate chambers can be increased, preventing scales from forming in the concentrate chambers. At least one of two sub-desalination chambers can be filled with a single ion exchange material such as an anion exchange material or a cation exchange material. The thickness of the desalination chambers can be set at an optimum thickness to reduce the electric resistance and the amount of ion exchange membranes used in the apparatus can be reduced compared to the case of the conventional apparatus.

The deionizing module of the present embodiment requires only one more frame and one more ion exchange membrane than a conventional deionizing module. This is a minor change although the basic structure of the deioninzing module is improved. Furthermore, number of module can be reduced to a half comparing to the conventional one.

When a single ion exchange membrane is used as the intermediate ion exchange membrane, the ion exchange membrane can be selected depending on the ion(s) to be removed from the water to be treated. Specifically, when it is desired to remove more cations from the water to be treated, a cation exchange membrane can be used and when it is desired to remove more anions from the water to be treated, an anion exchange membrane can be used. When a composite or discrete membrane is used, a cation exchange membrane is provided on the upper side of the apparatus and an anion exchange membrane is provided on the lower side, or vice versa. When, for example, a cation membrane is provided on the input side (entrance side) of the first sub-desalination chamber and an anion exchange membrane is provided on the discharge side (exit side) of the first sub-desalination chamber, cation constituents move from the second sub-desalination chamber to the first sub-desalination chamber, causing the pH value of the first sub-desalination chamber to change to alkali side. Then, ionization of nonionic silica is promoted and further reduction of silica occurs through the anion exchange membrane provided on the discharge side (exit side) of the first sub-desalination chamber.

With a structure where the second sub-desalination chamber is filled with an anion exchange material and the first sub-desalination chamber is filled with a mixture of anion and cation exchange materials, it is possible to sufficiently treat water with a large amount of anion constituents, especially water containing weak acid constituents such as silica and carbonic acid. When the water to be treated in the sub-desalination chambers filled with a mixed exchange material of anion and cation exchange materials and the concentrate water flow in opposite directions, the concentrate water with concentrate cation constituents such as magnesium and calcium ions can be immediately discharged from the concentrating chamber, thereby preventing scale formation within the concentrating chambers.

EXAMPLES

The present invention is described further citing examples. These examples are meant to be exemplary only and are not intended to limit the scope of the invention.

Example 1

An EDI apparatus comprising three parallel deionizing modules (six sub-desalination chambers) as shown in FIG. 3 was prepared with the following specifications. Water was passed through the desalination and concentrate chambers for 5000 hours under the following operating conditions. The results are shown in Table 1.

Specifications:
Water to be treated and feed concentrate water:
Pemeate water obtained by treating industrial water with a reverse osmosis apparatus
Resistivity of the water to be treated: 0.31 MΩ·cm(=MΩcm)
First sub-desalination chamber: Width 300 mm, Height 600 mm, Thickness 3 mm
Ion exchange resins filling the first sub-desalination chamber:
Mixed bed of ion exchange resins of anion exchange resin (A) and cation exchange resin (K) with a volume ratio of A:K=1:1
Second sub-desalination chamber: Width 300 mm, Height 600 mm, Thickness 8 mm
Ion exchange resin filling the second sub-desalination chamber:
Single bed of anion exchange resin
Overall flow rate: 1 m³/h
Current: a constant value of 1.5A

Comparative Example 1

An EDI apparatus comprising six parallel deionizing modules as shown in FIG. 4 was prepared with the following specifications. Water was passed through the desalination and concentrate chambers for 5000 hours under the following operating conditions. The results are shown in Table 1. The quality of water to be treated and of the feed concentrate water and the overall flow rate of the apparatus were identical to those of the Example 1.

Specifications:
Desalination chamber: Width 300 mm, Height 600 mm, Thickness 8 mm
Ion exchange resin filling the desalination chambers:
Upper half of the desalination chamber filled with a single bed of anion exchange resin identical to that of Example 1 and the lower half of the desalination chamber filled with the mixed bed of ion exchange resins identical to that of Example 1.
Current: a constant value of 1.5A

TABLE 1

|  | Example 1 | Comparative Example 1 |
|---|---|---|
| Average applied voltage(V) | 100 | 150 |
| Current(A) | 1.5 | 1.5 |
| Resistivity of treated water after 5000-hour deionization(MΩ · cm) | 17.9 | 17.7 |

It can be seen from Table 1 that the EDI apparatus of Example 1 reduced electric power by 33% over the Comparative Example 1 when 1.5 A of electric current was to be maintained.

Comparative Example 2

An apparatus similar to that of Example 1, but with the thickness of the first sub-desalination chamber filled with the mixed bed of cation and anion exchange resins being changed to 0.5 mm, was prepared. This apparatus was operated under conditions identical to those of Example 1. The results are shown in Table 2.

Comparative Example 3

An apparatus similar to that of Example 1, but with the thickness of the first sub-desalination chamber filled with the mixed bed of cation and anion exchange materials being changed to 10 mm, was prepared. This apparatus was operated under conditions identical to those of Example 1. The results are shown in Table 2.

Comparative Example 4

An apparatus similar to that of Example 1, but with the thickness of the second sub-desalination chamber filled with the single bed of anion exchange resin being changed to 3 mm, was prepared. This apparatus was operated under conditions identical to those of Example 1. The results are shown in Table 2.

Comparative Example 5

An apparatus similar to that of Example 1, but with the thickness of the second sub-desalination chamber filled with the single bed of anion exchange resin being changed to 17 mm, was prepared. This apparatus was operated under conditions identical to those of Example 1. The results are shown in Table 2.

TABLE 2

|  | Comparative Example | | | |
|---|---|---|---|---|
|  | 2 | 3 | 4 | 5 |
| Average applied voltage(V) | 80 | 140 | 100 | 120 |
| Current(A) | 1.5 | 1.5 | 1.5 | 1.5 |
| Resistivity of treated water after 5000-hour deionization (MΩ-cm) | 7.7 | 16.8 | 15.5 | 17.1 |

As shown in Table 2, when the thickness of each of the sub-desalination chambers was overly increased or decreased, the electric resistance of the apparatus increased or the quality of the treated water was degraded.

What is claimed is:

1. An electrodeionization apparatus for removing ions from water, comprising:
   a series of desalination chambers each provided with a cation exchange membrane on one side and an anion exchange membrane on the other side, and filled with ion exchange materials,
   a concentrate chamber provided on either side of said cation and anion exchange membranes, and
   a pair of electrodes interposing the said desalination and concentrate chambers, wherein
   said each desalination chamber is divided into two sub-desalination chambers by an intermediate ion exchange membrane provided between said cation and anion exchange membranes.

2. An electrodeionization apparatus of claim 1, wherein said each desalination chamber comprises:
   said cation exchange membrane,
   a first frame,
   said intermediate ion exchange membrane,
   a second frame, and
   said anion exchange membrane layered in that order.

3. An electrodeionization apparatus of claim 1, wherein said intermediate ion exchange membrane is one exchange membrane selected from a group of a single cation exchange membrane, a single anion exchange membrane, and a discrete cation and anion exchange membrane.

4. An electrodeionization apparatus of claim 3, wherein
   one of said two sub-desalination chambers is defined by said intermediate ion exchange membrane and anion exchange membrane and is filled with an anion exchange material, and
   the other sub-desalination chamber is defined by said cation exchange membrane and intermediate ion exchange membrane and is filled with anion and cation exchange materials.

5. An electrodeionization apparatus of claim 1, wherein
   said two sub-desalination chambers are each provided with inlets and outlets, and
   said outlets of one of the two sub-desalination chambers are connected to said inlets of the other sub-desalination chamber so that said two sub-desalination chambers are serially connected.

6. An electrodeionization apparatus of claim 5, wherein
   outlets of one of the two sub-desalination chambers is connected to said inlets of the other sub-desalination chamber by a connecting line, and
   the water to be treated flows in the same direction in both of said two sub-desalination chambers.

7. An electrodeionization apparatus of claim 6, wherein concentrate water flows in said concentrate chambers interposing each desalination chamber (two sub-desalination chambers) in a direction opposite of the flow direction of the water to be treated in said desalination chamber.

8. An electrodeionization apparatus of claim 1, wherein each of said two sub-desalination chambers is filled ion exchange material(s) which is or are different from that (those) in the other sub-desalination chamber.

9. An electrodeionization apparatus of claim 8, wherein said two sub-desalination chambers have different thicknesses.

10. An electrodeionization apparatus of claim 1, wherein one of said two sub-desalination chambers is defined by said intermediate ion exchange membrane and anion exchange membrane, and is filled with an anion exchange material, and the other sub-desalination chamber is defined by said cation exchange membrane and said intermediate ion exchange membrane, and is filled with anion and cation exchange materials.

11. An electrodeionization apparatus of claim 10, wherein said one sub-desalination chamber filled with an anion exchange material has a thickness in a range between 5 mm and 15 mm, and said other sub-desalination chamber filled with cation and anion exchange materials has a thickness in a range between 0.8 mm and 8 mm.

12. An electrodeionization method for producing deionized water using an electrodeionization apparatus, wherein said electrodeionization apparatus comprises a series of desalination chambers each provided with a cation exchange membrane on one side and an anion exchange membrane provided on the other side, and filled with ion exchange materials, a concentrate chamber provided on either side of said desalination chamber via said cation or anion exchange membranes, and a pair of electrodes interposing the said assembly of desalination and concentrate chambers, and wherein said each desalination chamber is divided into two sub-desalination chambers by an intermediate ion exchange membrane provided between said cation and anion exchange membranes, said method comprising the steps of, supplying the water to be treated into first sub-desalination chambers and supplying the water discharged from said first sub-desalination chambers into said second sub-desalination chambers while applying a voltage between said pair of electrodes, supplying concentrate water to said concentrate chambers, concentrating the impurity ions present in the water to be treated in said concentrate water, and producing deionized water as water discharging from said second sub-desalination chambers.

13. A method of claim 12, wherein the water flows in the same direction in both of said two sub-desalination chambers.

14. A method of claim 13, wherein concentrate water within said concentrating chambers flows in a direction opposite to the flow of water within said two sub-desalination chambers.

15. A method of claim 12 wherein said intermediate ion exchange membrane is selected from a group of a single cation exchange membrane, a single anion exchange membrane, and a discrete cation and anion exchange membrane.

16. A method of claim 12, wherein one of said two sub-desalination chambers is defined by said intermediate ion exchange membrane and said anion exchange membrane and is filled with an anion exchange material, and the other sub-desalination chamber is defined by said cation exchange membrane and said intermediate ion exchange membrane and is filled with anion and cation exchange materials.

17. A method of claim 16, wherein said intermediate ion exchange membrane is selected from a group of a single cation exchange membrane, a single anion exchange membrane, and discrete cation and anion exchange membrane.

* * * * *